(12) United States Patent
McClelland et al.

(10) Patent No.: US 6,330,438 B1
(45) Date of Patent: Dec. 11, 2001

(54) AUDIBLE WARNING PRIOR TO LOSING CELL CALL IN PROGRESS

(75) Inventors: Linda K. McClelland, Warrenville; Eugene A. Madison, Jr., Naperville, both of IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/408,877

(22) Filed: Sep. 29, 1999

(51) Int. Cl.$^7$ ........................................... H04B 7/00
(52) U.S. Cl. ............................. 455/421; 455/436
(58) Field of Search ................................. 455/420, 421, 455/423, 67.1, 67.7, 229.1, 436, 450, 438

(56) References Cited

U.S. PATENT DOCUMENTS 5,373,548 * 12/1994 McCarthy ........................ 455/421
5,722,068 * 2/1998 Bartle et al. ..................... 455/421

* cited by examiner

Primary Examiner—Thanh Cong Le
(74) Attorney, Agent, or Firm—Emrich & Dithmar

(57) ABSTRACT

In a cellular telephone system, as the strength of the signal between a cell site and a mobile unit weakens in the absence of another cell site to hand off the mobile unit to, the mobile unit user is warned of the impending loss of the call before it occurs. This allows the user sufficient time to take precautionary steps such as moving or re-orienting the hand-held mobile unit to compensate for the loss of signal strength and maintain integrity of the communications link. The mobile unit user is warned of a signal level reduction below a predetermined threshold by means of an audible tone emitted by the mobile unit's earpiece prior to loss of a call in progress.

7 Claims, 5 Drawing Sheets

US 6,330,438 B1

AUDIBLE WARNING PRIOR TO LOSING CELL CALL IN PROGRESS

TECHNICAL FIELD OF THE INVENTION

This invention relates generally to cellular telephone systems and is particularly directed to providing a cellular telephone user with an audible indication of low signal strength of a call in progress to allow the user to take precautionary steps to avoid loss of the call.

BACKGROUND OF THE INVENTION

Referring to FIG. 1, there is shown in simplified schematic diagram form a cellular telephone network 10 in which the present invention is intended for use. The three major components of the cellular telephone network 10 are a Mobile Switching Center (MSC) 16, a plurality of cell sites, or base stations, and a mobile unit, or station, 18. FIG. 1 shows cell sites A, B and C in the cellular telephone network 10. The MSC 16 is connected by wire to a Public Switched Telephone Network (PSTN) 14 shown in dotted line form in the figure. The PSTN 14 typically includes a large number of fixed telephones 12 for placing and receiving calls. The MSC 16 interfaces with the PSTN 14 and the cell sites via control links and voice trunks. The MSC 16 is also involved with switching calls between different cell sites in real time as the mobile unit 18 moves from the coverage area of one cell site to another. This process is known as a call "handoff" of the mobile unit 18 between adjacent cell sites.

A call handoff is performed in the following manner. Where the mobile unit 18 is served by cell site A, this cell site determines that the signal from the mobile unit is getting weak. Cell site A communicates the weakening of the received signal to the MSC 16 which then prompts neighboring cell sites B and C to measure the signal strength from the mobile unit and report their findings back to cell site A. Cell site A then selects the best set of neighbor cell sites that can accept the mobile unit 18 and requests a handoff from the MSC 16. The MSC 16 then informs the new cell site B that it is to accept a handoff and directs cell site B to tune to a selected radio channel being used by the mobile unit 18. The MSC 16 directs cell site A to direct the mobile unit 18 to tune to the new voice radio channel. The MSC 16 then switches the call from cell site A to cell site B, with the mobile unit 18 re-tuning to the new channel associated with cell site B.

The procedure described above is followed when a second cell site is available for handing off the mobile unit when the strength of the communications signal is too low to continue the call. In some cases, there may not be another cell site available for handing the mobile unit off to and the call is lost when the signal level is reduced to the point where the serving cell site can no longer maintain communications contact with the mobile unit. The present invention addresses this problem by alerting the mobile unit to a dangerously low signal level, allowing the user to take precautionary steps to avoid loss of the call.

SUMMARY OF THE INVENTION

This invention is intended for use in a cellular telephone system and is set into operation when the signal level to a mobile user from a serving cell site is reduced below a predetermined threshold signal level and there is no other cell site within the cellular network to hand the mobile user off to in order to continue the call in progress. This invention alerts the mobile user of the impending loss of the call because of the reduced signal level before it occurs and allows the user sufficient time to take precautionary steps to avoid loss of the call. Typical precautionary steps would include the user moving or re-orienting the hand-held mobile unit to compensate for the loss of signal strength by improving signal reception. An audio signal is provided during the call in progress via the hand-held mobile unit's earpiece to the user to alert the user to take appropriate precautionary steps for maintaining integrity of the communications link. The invention makes use of existing circuitry within the hand-held mobile unit to compare the received signal level with a predetermined threshold level and provide an appropriate drive signal to the unit's earpiece for providing an audio signal to the user either in the form of a continuous tone or as a pulsed signal. The invention also employs existing communications links between the mobile unit and the cell site.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
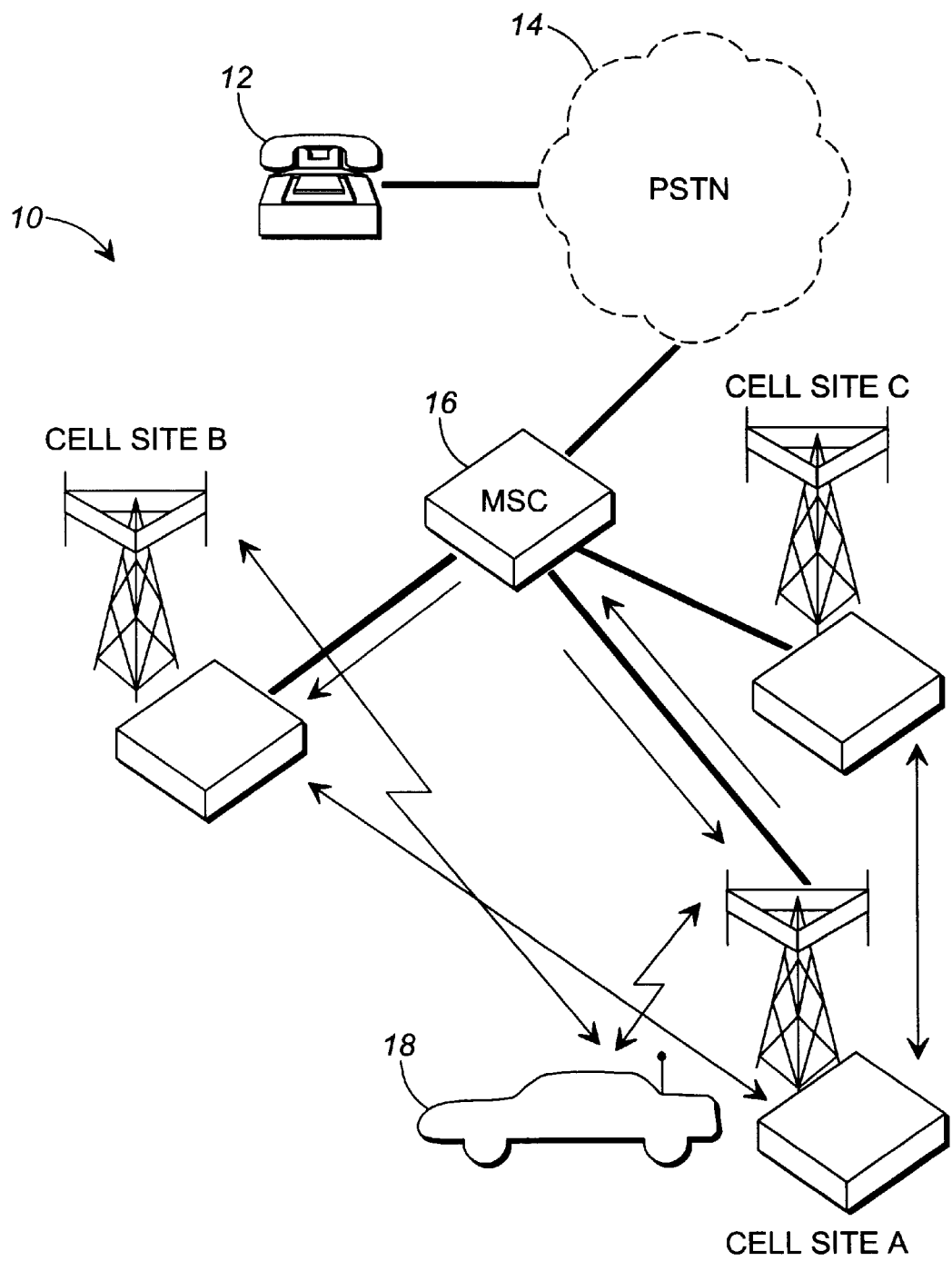
FIG. 1 is a simplified schematic diagram of a cellular telephone network in which the present invention is intended for use.
Figure 2:
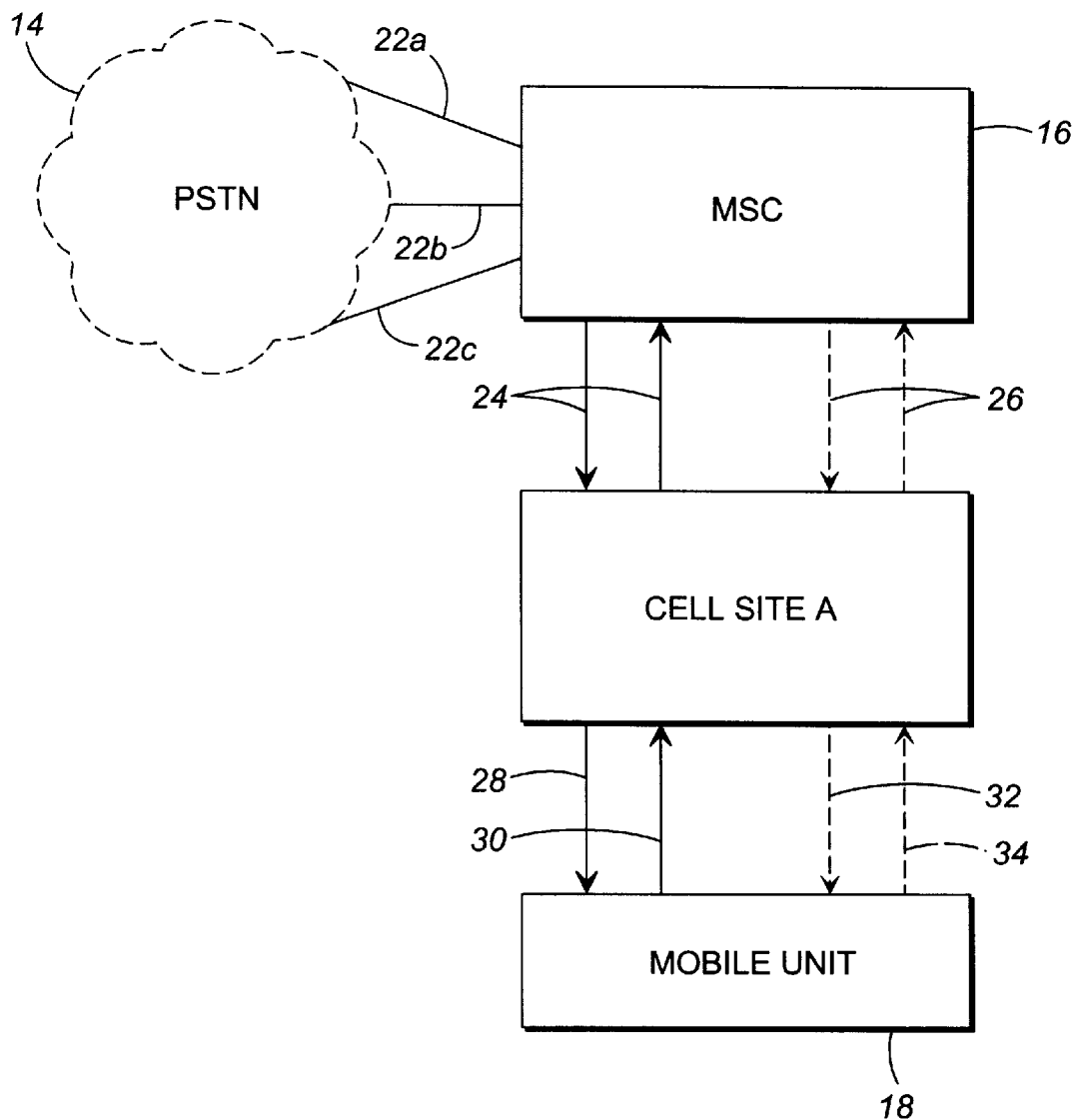
FIG. 2 is a block diagram showing the communication links between a mobile unit, a cell site, and a mobile switching center in a typical cellular telephone network.

Referring to FIG. 2, there is shown in simplified block diagram form the communication links in a typical cellular telephone network. The mobile switching center (MSC) 16 is connected to the public switched telephone network (PSTN) 14 by means of a plurality of land lines 22a, 22b and 22c. Communications between the MSC 16 and cell site A, or base station, is by means of a pair of voice circuits 24 and a pair of data links (shown in dotted line form) 26. The voice circuits 24 allow voice communication between the MSC 16 and cell site A in both directions, while the data links 26 allow for control signals to pass in both directions between the MSC and cell site A. Cell site A is in communication with the mobile unit 18 via a forward voice channel 28 and a reverse voice channel 30. Communications on the voice channels 28,30 are both analog and digital. Communications between cell site A and mobile unit 18 is also by means of forward and reverse setup channels 32 and 34 (shown in the figure in dotted line form). Communications on the setup channels is in digital form. The setup channels allow the mobile unit 18 to access the cellular telephone network. The voice channels 28,30 are used for voice communication, for handoff of a mobile unit between a pair of cell sites, dynamic power control, and other functions carried out between a cell site and a mobile unit.

Figure 3:
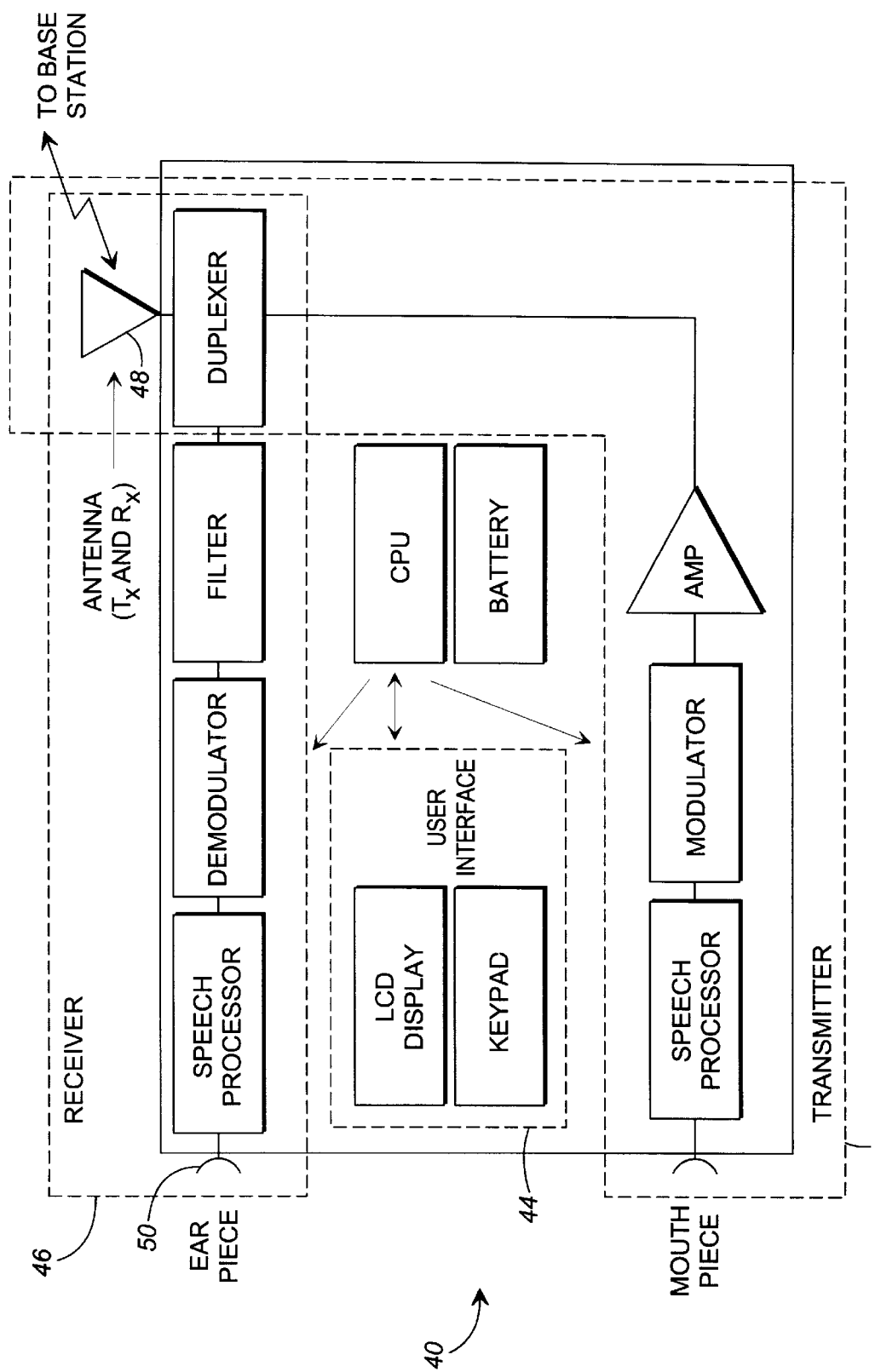
FIG. 3 is a block diagram of circuitry employed in a mobile unit with which the present invention is intended for use.

Referring to FIG. 3, there is shown a simplified combined schematic and block diagram of a hand-held mobile unit 40 with which the present invention is intended for use. Mobile unit 40 is conventional in design and operation and includes (as shown in dotted line form), a transmitter 42, a user interface 44, and a receiver 46. A tone request signal described below is received by the antenna 48 of the mobile unit 40 from the cell site with which the mobile unit is in communication. The tone request signal is processed by the mobile unit's receiver 46 for providing an audio tone at the mobile unit's earpiece 50. The audio tone emitted by earpiece 50 alerts a user of the mobile unit 40 that the cellular telephone signal level is reduced and that the communications link will shortly be lost because of the absence of another cell site to hand the call off to. This audio signal alerts the user to take precautionary measures to avoid interruption of the cellular call such as by reorienting or repositioning the mobile unit to increase the received signal strength.

Figure 4:
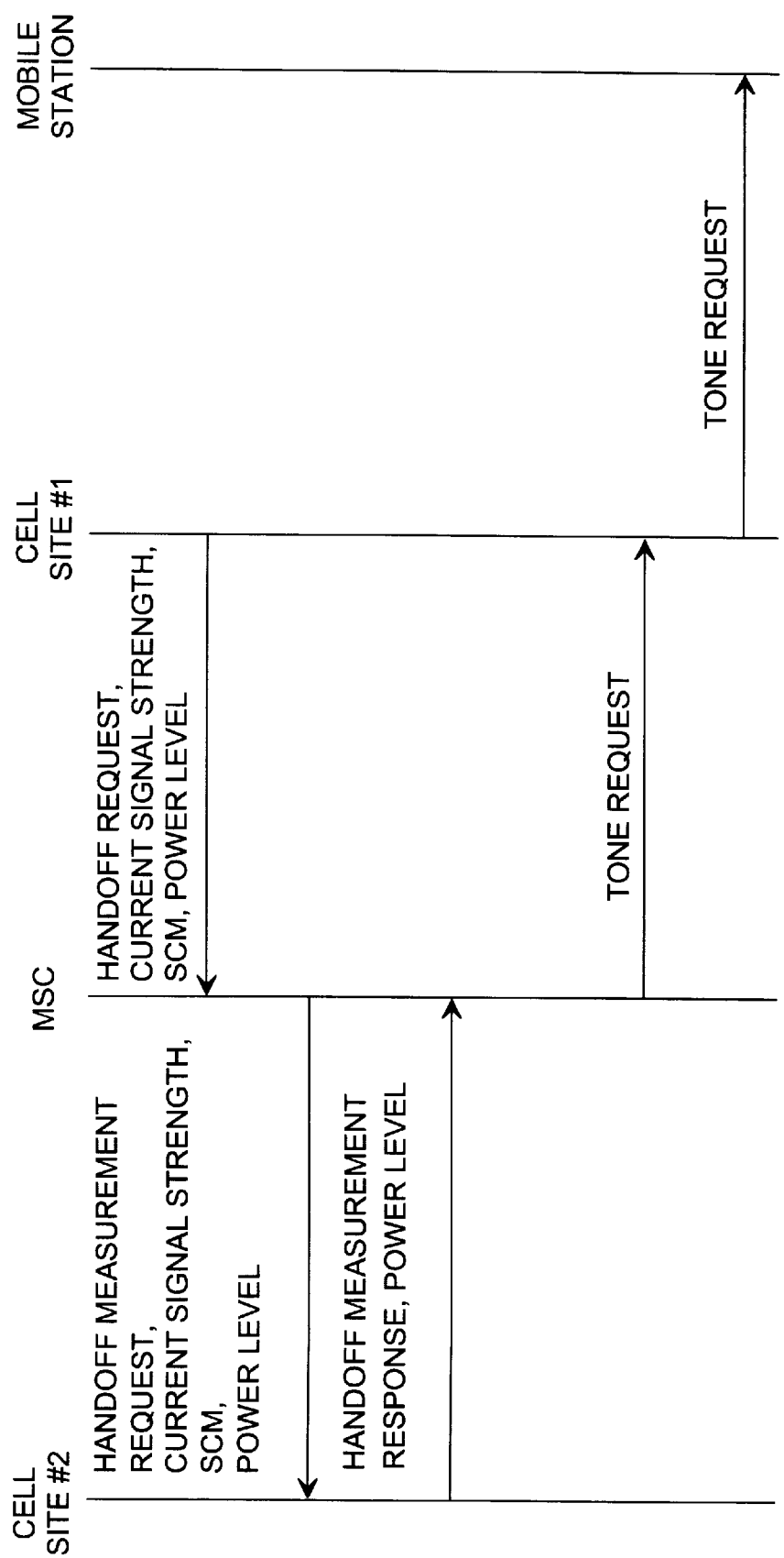
FIG. 4 is a simplified flow diagram illustrating the signals communicated between various elements of a cellular telephone system in accordance with the present invention.

Referring to FIG. 4, there is shown in simplified schematic diagram form a procedure carried out in a cellular telephone network for providing an audible warning prior to losing a cell call in progress in accordance with the present invention. At the top of FIG. 4 are listed four elements of the cellular telephone network, i.e., cell sites 1 and 2, an MSC, and a mobile station. Arrows in the figure represent the transmission of signals between the various elements of the network, with the process starting at the top of the figure and continuing over time in proceeding downwardly in the figure. Initially, cell site 1 determines that the strength of the reverse Traffic Channel (TCH) signal from the mobile station requires the consideration of a handoff of a call to the mobile station from cell site 1 to another cell site. Cell site 1 then sends a handoff request to the MSC containing information relevant to the mobile station such as power level, station class mark (SCM), and current reverse TCH signal strength. The MSC receives the handoff request and determines which cells are adjacent to cell site 1. In the present example, cell site 2 is adjacent the MSC. Thus, the MSC sends a handoff measurement request to cell site 2 as shown in the figure. The handoff measurement request includes essentially the same information as that received by the MSC from cell site 1. Cell site 2 receives the handoff measurement request and uses its locating receiver to determine the suitability of handoff. The locating receiver in cell site 2 tunes to the reverse TCH frequency the mobile station is currently using, makes signal strength measurements on all (or some) antennas, and determines whether or not the Supervisory Audio Tone (SAT) color code the mobile station is using can be detected. Cell site 2 then provides a handoff measurement response and a power level indication to the MSC. In the present invention, cell site 2 provides a hand off response to the MSC indicating that a hand off of the call is not possible.

Figure 5:
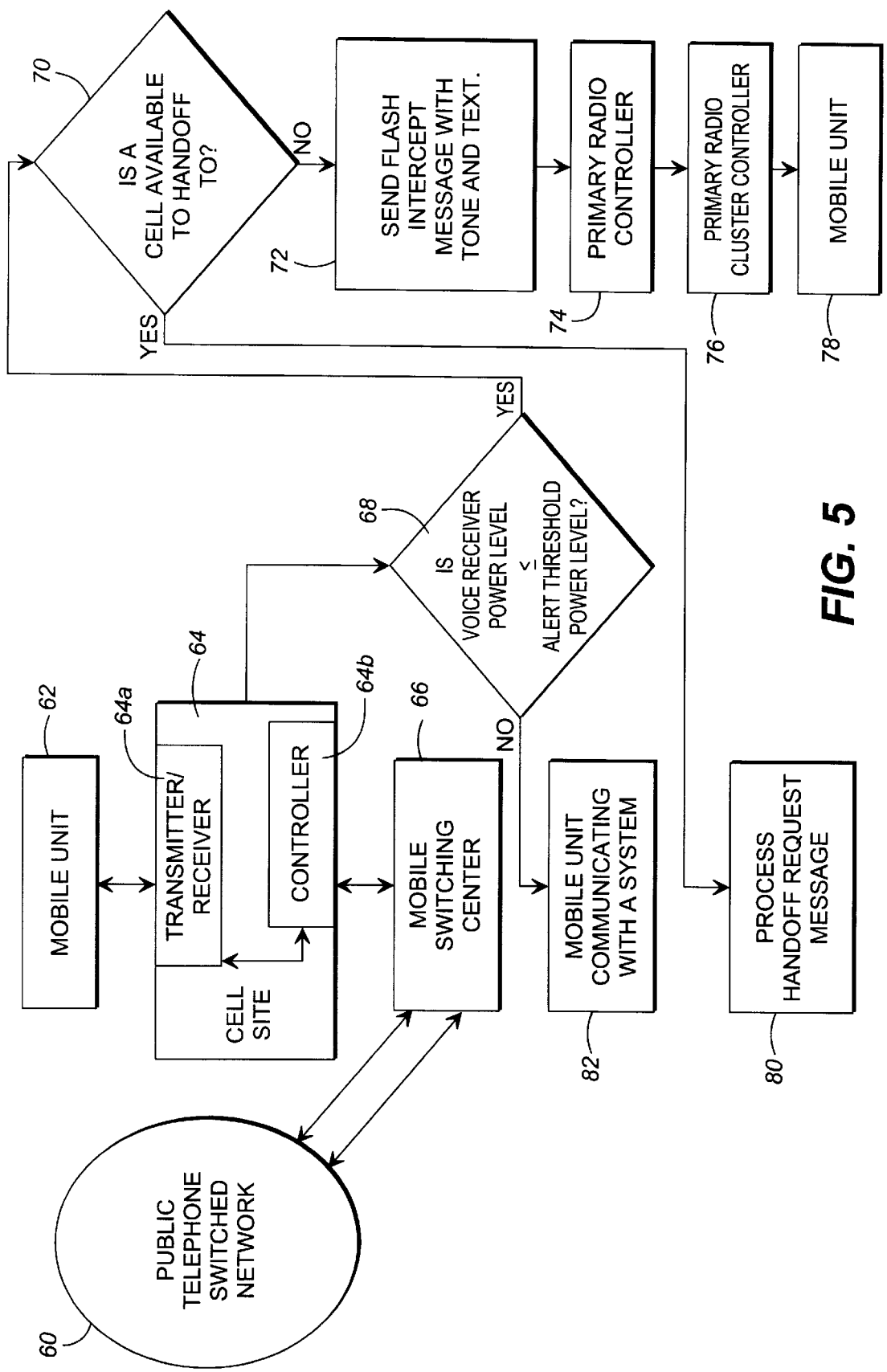
FIG. 5 is a combined block diagram and flow chart illustrating the flow of signals between various components of a cellular telephone system and the steps involved in providing an audible warning to a cellular telephone system user prior to losing a cellular telephone call in progress in accordance with the principles of the present invention.

Referring to FIG. 5, there is shown a simplified flowchart of the flow of signals and the steps carried out at a cell site for providing an audio indication to a mobile unit user that the received signal level is below a predetermined threshold level in accordance with the present invention. As described earlier, each cell site 64 is connected to a PTSN 60 by means of a mobile switching center 66. Details of the communications links between the MSC 66 and the PTSN 60 and cell site 64 as well as with the mobile unit 62 are described with reference to FIG. 2. A cell site controller 64b compares the power level of the received voice signal at step 68 with a predetermined threshold power level. If the voice receiver power level is not less than the predetermined threshold power level, the program stored in the cell site's controller 64b proceeds to step 82 and enables the mobile unit 62 to communicate with the cell site 64 via the cell site's transmitter/receiver 64a.

If at step 68, it is determined that the voice receiver power level is less than or equal to the alert threshold power level, the program proceeds to step 70 to determine if there is another cell site available to handoff the mobile unit to. If the program determines at step 70 that there is another available cell site for handling the communications of the mobile unit, the program proceeds to step 80 and processes a hand off request message from the mobile unit. If at step 70 it is determined that there is not another cell site available to hand off the mobile unit to, the program proceeds to step 72 and sends a flash intercept message with tone and text to the mobile unit. This signal is provided to the primary radio controller at step 74 and thence to the primary radio cluster controller at step 76. The signal is then provided from the primary radio cluster controller 76 to the mobile unit at step 78 for activating the mobile unit's earpiece for providing an audio tone to the user indicating that the communications signal is below a predetermined alert threshold power level and that communications will be lost unless the user undertakes precautionary steps to either maintain or increase the signal level.

If the handoff measurement response provided by cell site 2 to the MSC indicates that cell site 2 is not a good candidate for call handoff, e.g., the signal strength is too low, the MSC sends a Tone Request to cell site 1 which, in turn, relays the Tone Request to the mobile station. Typically, a database in the cell site is used to determine whether or not a response to the handoff measurement request is warranted. An algorithm is used to detect the need for handoff and to detect the probability that the new cell site will be able to sustain the call. The database as well as the algorithm used in the cell site for call handoff purposes are not part of the present invention and thus not described further herein. The tone request signal provided to the mobile station is processed by the mobile station to provide an audio tone from the mobile station's earpiece as previously described. Tone request signals are currently provided to telephone receivers, including mobile telephone receivers, for such purposes as providing an audio indication of call waiting. Current applications of the use of tone signals provided to a mobile station do not include the use of these types of signals for indicating to a user of the mobile unit of an impending loss of a cellular telephone call as contemplated by the present invention.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

We claim:

1. For use in a cellular telephone system including a switching center and a plurality of mobile units and cell sites, a method for alerting a mobile unit user of a reduction in signal strength and an impending loss of a call in progress in the absence of another cell site to hand off the mobile unit user to, said method comprising the steps of:

comparing a received signal strength of a call in progress with a predetermined alert power level;

providing a tone request signal to the mobile unit if the received signal strength is less than said predetermined alert power level;

providing an audio tone from the mobile unit in response to receipt of said tone request signal for alerting the mobile unit user to an impending loss of a call in progress and allowing the mobile unit user to take steps to avoid loss of the call; and providing a handoff request from a first cell site providing the call in progress to the mobile unit to a second cell site via said mobile switching center and said second cell site providing a handoff measurement response to said mobile switching center, wherein said handoff measurement response indicates that the signal power level is too low to hand off the mobile unit to said second cell site.

2. The method of claim 1 wherein said tone request signal is provided to the mobile unit via said first cell site.

3. The method of claim 2 wherein said audio tone is in the form of a continuous tone signal or a pulsed tone signal.

4. The method of claim 3 wherein the mobile unit includes an ear piece and wherein the step of providing an audio tone from the mobile unit includes providing an audio tone from said ear piece.

5. For use in a cellular telephone system including plural mobile units and cell sites, apparatus for alerting a mobile unit user of an impending loss of a call in progress due to a reduction in signal strength in the absence of a cell site to hand off the mobile unit to, said apparatus comprising:

a controller in a cell site serving the mobile unit for comparing cellular call signal strength with a predetermined alert power level;

a transmitter in the cell site serving the mobile unit coupled to said controller for providing a tone request signal to the mobile unit when the cellular call signal strength is less than said predetermined alert power level;

an audio tone generator in the mobile unit responsive to said tone request signal for providing an audio tone for alerting the mobile unit user of an impending loss of a call in progress and allowing the mobile unit user to take steps to avoid loss of the call; and a mobile switching center for receiving a handoff request signal from a first cell site serving the mobile unit and for providing said handoff request signal to a second cell site and providing said tone request signal to the mobile unit in the absence of said second cell site to hand off the mobile unit to.

6. The apparatus of claim 3 wherein said audio tone generator includes an ear piece.

7. The apparatus of claim 6 wherein said tone request signal is provided to the mobile unit via said first cell site.

* * * * *